(12) United States Patent
Homan et al.

(10) Patent No.: US 6,193,260 B1
(45) Date of Patent: Feb. 27, 2001

(54) HITCH PIN RETAINER ASSEMBLY

(76) Inventors: Todd B. Homan, 2820 State Rte. 119, St. Henry, OH (US) 45883; Ronald L. Stammen, 3112 County Rd. 716A, Celina, OH (US) 45822

( * ) Notice: Subject to any disclaimer, the term of this patent is extended or adjusted under 35 U.S.C. 154(b) by 0 days.

(21) Appl. No.: 09/388,688

(22) Filed: Sep. 2, 1999

(51) Int. Cl.$^7$ .................................................. B60D 1/100
(52) U.S. Cl. ........................... 280/515; 280/504; 280/507
(58) Field of Search .................................. 280/515, 507, 280/504

(56) References Cited

U.S. PATENT DOCUMENTS

| | | | |
|---|---|---|---|
| 2,193,938 | * | 3/1940 | Roberts ................................ 280/504 |
| 2,204,116 | * | 6/1940 | Blocher ................................ 411/347 |
| 2,593,247 | * | 4/1952 | Benteman ........................... 280/515 |
| 2,705,157 | * | 3/1955 | Dail ..................................... 280/515 |
| 3,190,677 | * | 6/1965 | Robbins .............................. 280/515 |
| 3,247,753 | * | 4/1966 | Appleberry ......................... 411/350 |
| 3,782,762 | * | 1/1974 | Nagy et al. ......................... 280/507 |
| 4,193,611 | * | 3/1980 | Fisk ..................................... 280/416.1 |
| 4,195,704 | * | 4/1980 | Bass et al. .......................... 180/14.1 |
| 4,552,377 | * | 11/1985 | Folkerts .............................. 280/515 |
| 4,579,364 | * | 4/1986 | Kranz .................................. 280/507 |
| 4,671,528 | * | 6/1987 | Thompson ............................. 1/337 |
| 4,783,094 | * | 11/1988 | Sands ................................... 280/515 |
| 5,240,266 | * | 8/1993 | Kelley et al. ....................... 280/204 |
| 5,354,087 | * | 10/1994 | Head ................................... 280/490.1 |
| 5,413,366 | * | 5/1995 | Gibbons ............................. 280/490.1 |

* cited by examiner

Primary Examiner—Brian L. Johnson
Assistant Examiner—Deanna Draper
(74) Attorney, Agent, or Firm—Sean M. Casey (57) ABSTRACT

A hitch pin retainer assembly that prevents unintended displacement of a shear pin from a trailer hitch includes a hitch plate assembly having a base plate formed with an aperture adapted to receive the shear pin assembly and having a retainer ledge. The hitch plate assembly also includes a latch plate that carries a latch assembly that incorporates a receptacle projecting from the latch plate that captures a spring biased, slidable latch pin that is sized to extend, when in an extended position, above the shear pin. The latch pin is also formed with a handle at one end. The hitch pin retainer assembly can be either bolted or welded to an existing trailer hitch and also includes a tether that can be attached to the shear pin to prevent accidental loss.

12 Claims, 5 Drawing Sheets

HITCH PIN RETAINER ASSEMBLY

BACKGROUND OF THE INVENTION

1. Field of the Invention

The present invention relates generally to hitch pin retainers that are used to prevent the unwanted removal or displacement of a hitch pin from a trailer hitch and tongue assembly when one vehicle tows another vehicle, for example, when a tractor tows a farm implement such as a trailer, plow, seeder, grading machine, or harvesting machine.

2. Background

A variety of attempts have been made to prevent the unwanted displacement and loss of the hitch pins that releasably connect a trailer hitch to a trailer tongue during towing operations where a vehicle such as a tractor pulls a trailer, machine, or iarm-type implement. Many of these attempts have failed to live up to expectations. This is most often because prior art devices require specialized hardware and or because the devices are not compatible for use with the most widely available types of hitch pins, trailer hitches, and trailer tongues. Also, the hitch pins are often lost or misplaced during non-use because when the pin falls out of the trailer hitch-tongue assembly during operation, it often drops to the ground in a field or a road where the pin is quickly hidden from view and lost. The prior art hitch pin retainer devices often fail to perform as intended either because the retainer device fails to retain the pin during operation or because the devices incorporate mechanisms that are so complicated to use that the operator elects to avoid employing the device to avoid the difficulty. Other types of retention devices are too costly to manufacture and purchase and are neither widely available nor used. Examples of prior art devices that are directed to devices that are expensive to manufacture, complicated to use, or that may not be compatible for use with the most widely available types hitch pins, trailers, and hitches include those disclosed in, for example, U.S. Pat. Nos. 3,825,284; 3,998, 472; 4,415,175; 4,482,166; 4,526,396; 4,555,125; 4,666, 177; 4,671,528; 5,199,733; and 5,779,277. U.S. Pat. No. 3,825,284 reflects an example of a device that is limited to a hitch pin that includes a safety retaining pin adapted to positively prevent removal of a hitch pin from a trailer tongue to, in turn, prevent inadvertent uncoupling of an implement and towing vehicle. However, the device requires the use of a specialized stud that must be formed in the trailer tongue and which may not be present on commonly used trailer hitch assemblies without special modifications. Similarly, U.S. Pat. No. 3,998,472 is restricted to a specially adapted trailer hitch that incorporates a spring-latch assembly adapted to retain a hitch pin in a trailer hitch. U.S. Pat. No. 4,415,175 is directed to a coupler latch mechanism that is expensive to manufacture in comparison to the preceding examples and that may be cost prohibitive to most operators who prefer a low-cost hitch pin to meet their trailer hitch coupling needs. U.S. Pat. Nos. 4,526,396 and 4,555,125 are both directed to customized hitch pin assemblies that incorporate a handle that is connected to a specialized hitch pin. The handles fold down over the hitch pin and surround and engage the entire coupled trailer hitch and tongue assembly in an attempt to prevent the inadvertent removal of the hitch pin. This type of hitch pin is has not found wide application because the cost exceeds the cost of the more commonly used hitch pins. Additionally, its use is restricted to those tractor-trailer coupling applications where the potential for interference of the typical hitch-tongue pivot mechanism would not pose a substantial problem during the operation of a tow vehicle when coupled to a trailer or towed implement. Experience with any of the preceding types of devices has shown that they are not immune from disconnection and decoupling of the trailer-hitch assembly when they are subjected to the severe vibration environment often encountered during operations of a tractor coupled to a trailer or other type of farm implement for towing.

What is needed is a cost-effective apparatus for retaining hitch pins to prevent unwanted displacement and or inadvertent removal from a trailer hitch and tongue assembly to thereby ensure that the assembly does not become decoupled during operation. Additionally, what is preferred but presently unavailable is a device that can be used as a hitch pin retainer that is compatible for use with the most widely available and presently used hitch pins and trailer hitch and tongue assemblies. The most preferred device should be comparable in cost to make, sell, and install as the most commonly available hitch pins presently known by and available to an operator for purchase in any of a wide array of wholesale and retail automotive, trucking, farming, and hardware supply outlets. The apparatus involved should be simple and straightforward in its design, installation, and use, and little effort should be required on the part of the manufacturer, parts supplier, and end-user to install, repair, and replace the device. Ideally, the hitch pin retainer assembly should incorporate a design that is compatible for use with the most readily available and widely used trailer hitch and tongue assemblies. Those assemblies include, for example, trailer hitches and tongues that are most widely used in farming operations where a simple hitch pin is employed for coupling a tractor and various trailers, machines, and farm-type implements.

SUMMARY OF THE INVENTION

The hitch pin retainer assembly of the present invention overcomes the many shortcomings of the prior art and efficiently prevents unintended displacement of a shear-type hitch pin assembly from a trailer hitch. The hitch pin retainer assembly includes a hitch plate assembly having a base plate formed with an aperture adapted to receive the shear pin assembly and having a retainer ledge. The hitch plate assembly is also formed with a latch plate that carries a latch assembly that incorporates a receptacle projecting from the latch plate that captures a spring or resilient member biased, slidable latch pin sized to extend, when in an extended position, to be disposed above and to retain and/or obstruct the shear hitch pin. The latch pin is also formed with a handle at one end. The hitch pin retainer assembly can be either bolted or welded to an existing trailer hitch and also includes a tether that can be attached to the shear pin to prevent accidental loss.

The present invention is directed to a hitch pin retainer assembly that includes a shear pin assembly that is formed with a head portion opposite a tapered end. The retainer assembly also includes a hitch plate assembly that has a base plate formed with an aperture adapted to receive the shear pin assembly and that has a retainer ledge. A latch plate is carried from the base plate and is formed with a latch pin hole. Also included is a retainer latch assembly that incorporates a receptacle that is substantially centered about the latch pin hole. The latch assembly projects from the latch plate and is formed with an interior recess having an open end adapted to receive a latch pin slidable between a retracted and an extended position. The latch pin is sized to extend, when in the extended position, through the recess to be disposed within latch cage. The latch pin is formed with an engagement end having a retainer pin configured to releasably engage the retainer ledge when the pin is in the retracted position, and an opposite end having a handle. A medial portion of the latch pin is formed between the engagement end and opposite end and includes a spring or resilient member seat pin. The retainer latch assembly also includes a receptacle cap attached to the open end of the receptacle to capture a metal extension spring, or compressible resilient member made from an elastic polymer such as rubber, received about the medial portion and within the recess. The captive spring or resilient member is operative to bias the latch pin towards the extended position to retain the shear hitch pin. In operation, the base plate is adapted to be fixedly attached to a trailer hitch member that is formed with at least one shear pin aperture whereby the latch pin is positioned to be, when in the extended position, disposed above the head portion of the shear pin after insertion into the at least one trailer hitch aperture. The shear hitch pin assembly is thereby obstructed from displacement to prevent unwanted or inadvertent removal during use of the retainer hitch assembly when a tow vehicle is coupled to a trailer or other towed implement with the trailer hitch and tongue assembly.

The present invention preferably further includes a hitch pin retainer assembly for preventing unintended displacement from a trailer hitch of a shear pin that includes a head portion opposite a tapered end. The hitch pin retainer assembly incorporates a hitch plate assembly that has a base plate formed with an aperture adapted to receive the shear pin assembly and that also has a retainer ledge. The hitch plate assembly also includes a latch plate that is carried from the base plate and which is formed with a latch pin hole. The retainer assembly also includes a latch assembly that has a receptacle that projects from the latch plate and which is substantially centered about the latch pin hole of the hitch plate assembly. The receptacle is formed with an interior recess that has an open end adapted to receive a latch pin slidable between a retracted and an extended position. The latch pin is sized to extend, when in the extended position, through the recess so that it is disposed above the head portion of the shear pin. The latch pin is also formed with a handle at one end and an opposite engagement end that includes a retainer pin configured to releasably engage the retainer ledge. The latch pin is also formed with a medial portion between the ends that includes a spring or resilient member seat. The latch assembly further includes a cap that is attached to the open end of the receptacle to capture an extension spring, or compressible resilient member made from an elastic polymer such as rubber, that is received about the medial portion and within the recess. The spring or compressible resilient member is operative to bias the spring seat of the latch pin, and in turn the latch pin, towards the extended position. The base plate is adapted to be fixedly attached to a trailer hitch member that has at least one shear pin aperture for receiving the shear hitch pin assembly and whereby the unintended displacement or removal of the shear hitch pin assembly is prevented during use of the hitch pin retainer assembly.

The invention also preferably includes a kit for retaining a shear pin in a trailer hitch that incorporates a hitch plate assembly with a base plate that includes a retainer ledge and an angled latch plate that is formed with a latch pin hole. The kit further incorporates a latch assembly that has a spring-loaded latch pin received within a captive receptacle substantially centered about and mounted from the angled latch plate. The latch pin is slidable between a retracted and an extended position and is sized to be disposed above the shear pin when in the extended position to prevent unwanted displacement of the shear pin from the trailer hitch. The latch pin includes a handle at one end and proximate to a distal or opposite end a retaining pin adapted to releasably engage the retainer ledge to hold the latch pin in the retracted position.

The present invention also teaches a method for preventing unwanted displacement of a shear hitch pin assembly from a trailer hitch having at least one aperture sized to receive the shear hitch pin assembly. The method includes the step of selecting a hitch pin retainer assembly that has a hitch plate assembly and a latch assembly. The selected hitch plate assembly includes a base plate and an angled latch plate with a latch pin hole. The base plate also incorporates a retainer ledge. The latch assembly includes a spring-biased (or compressible resilient member biased) latch pin captivated within a receptacle that is substantially centered about and mounted from the angled latch plate. The latch pin is slidable between a retracted and an extended position and it is biased towards the extended position and sized to obstruct, when in the extended position, the shear hitch pin. The latch pin also includes a handle at one end and a retaining pin proximate to an opposite end adapted to releasably engage the retainer ledge to hold the latch pin in the retracted position.

The method of the present invention further includes the step of attaching the hitch pin retainer assembly to the trailer hitch in a position whereby it is operative to prevent unintended displacement of the hitch pin assembly from the trailer hitch when the latch pin is in the extended position. As can be understood with reference to any of the previously described embodiments and variations thereof, the hitch pin retainer assembly can be attached to the trailer hitch by welding or with one or more bolts or a combination of both. If one or more bolts are used, then the base plate of the hitch plate assembly would be modified to include a pattern of at least one bolt hole.

Once the hitch pin retainer assembly has been selected and attached, while practicing the method of the present invention, the latch pin of the hitch pin retainer assembly is retracted to the retracted position and rotated so the retaining pin releasably engages the retainer ledge. Next, the shear hitch pin assembly is inserted into the at least one aperture of the trailer hitch. Finally, the latch pin of the hitch pin retainer assembly is rotated to disengage the retaining pin from the retainer ledge and the latch pin is released to the extended position whereby the engagement end is disposed above to obstiuct and retain the shear hitch pin assembly to prevent unintended displacement.

The present invention also contemplates that each of the preceding embodiments, either alone or in combination, is compatible to be welded to the trailer hitch. In welded configurations, the embodiments and variations thereof of the shear hitch pin retainer assembly are operative to prevent unwanted removal of the shear hitch pin from a coupled trailer tongue and trailer hitch assembly. Another variation of the present invention for use either alone or in combination with any of the preceding embodiments includes a modified trailer hitch pin retainer assembly that incorporates a pattern of one or more bolt holes configured so that the retainer assembly can be bolted onto a trailer hitch member in addition to welding or as a substitute for welding.

Other features and advantages of the invention will become apparent from the following detailed description, taken in conjunction with the accompanying drawings, which illustrate, by way of example, the features of the present invention.

BRIEF DESCRIPTION OF THE DRAWINGS

Referring now to the drawings, wherein like reference numerals, such as those with primes or double primes, across the several views refer to identical, corresponding or equivalent parts (for example, 10 and 10'designate similar, corresponding, or equivalent elements).

DETAILED DESCRIPTION OF THE PREFERRED EMBODIMENT

The hitch pin retainer assembly of the present invention more effectively and less expensively prevents unwanted displacement or removal of a shear hitch pin assembly that is used to couple a trailer hitch to a trailer tongue. This type of coupling method is employed most commonly when a tow vehicle, for example a tractor, is coupled to, for example, a trailer, machine, or other implement such as a plow, tiller, seeder, spreader, harvester, and or baler for towing. As can be understood with reference to FIGS. 1, 2, and 3, the present invention is a hitch pin retainer assembly 10 that can be attached by welding or bolting it to an existing trailer hitch member 15. The hitch pin retainer assembly 10 includes a shear hitch pin assembly 20 that is formed with a head portion 25 having a grip member 30 that are positioned opposite to a tapered end 35. The grip member 30 preferably forms a latch cage proximate to the head portion 25. The grip member 30 may be a rigid or flexible shaped wire that is pivotally attached to the head portion 25 as is shown in the figures. The grip member may also be any other type of equally suitable device that enables the user to grip the shear hitch pin assembly 20 for removal and insertion. Other types of handles that can be incorporated include, for example, a tether loop that accommodates one or more fingers, a handle that enables gripping by the user's full hand, or an extended grip post that projects upward from the head portion 25, or any combination of the above. A release pin aperture 40 may be included proximate to the tapered end 35 of the shear hitch pin assembly 20. The release pin aperture 40 is adapted to receive a release pin 45 that can be used in applications where an additional measure of protection is needed to prevent accidental or unwanted removal of the shear hitch pin assembly 20 from the hitch pin retainer assembly 10. A large number of commercially available shear hitch pins are available in many lengths and diameters, most of which are compatible for use with the present invention. Any selected shear hitch pin should be made from a high-strength, Group 3 steel that is protected from corrosion with a suitable coating including, for example, a yellow zinc dichromate plating. Any of the hitch pins available from SpeeCo Special Products Company of Golden, Colo., and referred to as swivel handle forged hitch pins, are suitable for use with the hitch pin retainer assembly of present invention including, for example, parts numbered P71011C and P71052C which are ½ diameter×4¼ inch long and 1 diameter×6¼ inch long hitch pins, respectively. Similar hitch pins are also available from John Deere and Company of East Moline, Ill., and the Tractor Supply Company of Nashville, Tenn.

A hitch plate assembly 50 is also included as paint of the hitch pin retainer assembly 10. The hitch plate assembly 50 has a base plate 55 that is formed with an aperture 60 sized and adapted to receive the shear pin assembly 20. The hitch plate assembly also incorporates a retainer ledge 65 and a latch plate 70 that is carried from the base plate 55 and angled relative to the base plate 55. The latch plate 70 is fanned with a latch pin hole 75. A pattern of at least one bolt hole 80 may be incorporated into the hitch plate assembly 50 for purposes of bolting it to the trailer hitch assembly 15. Although not essential to practice of the preferred embodiment of the present invention, the base plate 55 and the latch plate 70 can be formed from an integrally formed, bent strip of group 2 steel such as a strip that is approximately 4.5 inches in length by about 2.0 inches in width and about 0.25 inches in thickness. Preferably, the strip is plated or coated with a corrosion preventive material after machining to prevent rust.

The preferred embodiment of the hitch pin retainer assembly 10 further includes a spring-biased or compressible resilient member-biased retainer latch assembly 90 that incorporates a receptacle 95 that is substantially centered about the latch pin hole 75 of the latch plate 70 and which projects from the latch plate 70. The receptacle 95 is formed with an interior recess 97 that has an open end 100 which is adapted to receive a latch pin 110. The receptacle 95 can be made from tubular stock material or a solid stock material that is later machined to form the recess 97. An example of a suitable tubular material includes a galvanized SCH 40 pipe having a diameter of approximately 0.75 inches that is commercially available from the Fastenal Company as part number 66746.

Figure 1:
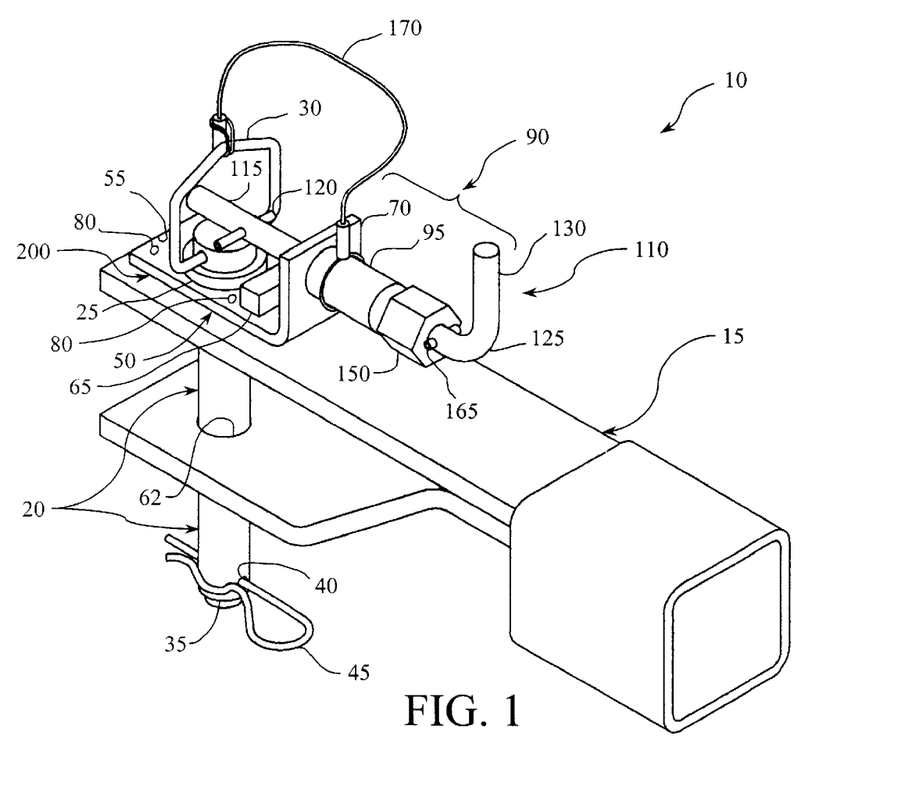
FIG. 1 depicts an elevated perspective view, in reduced scale, of a trailer hitch pin retainer assembly of a preferred embodiment the present invention attached to a portion of a trailer hitch and with a spring-biased latch pin assembly in an extended position.
Figure 2:
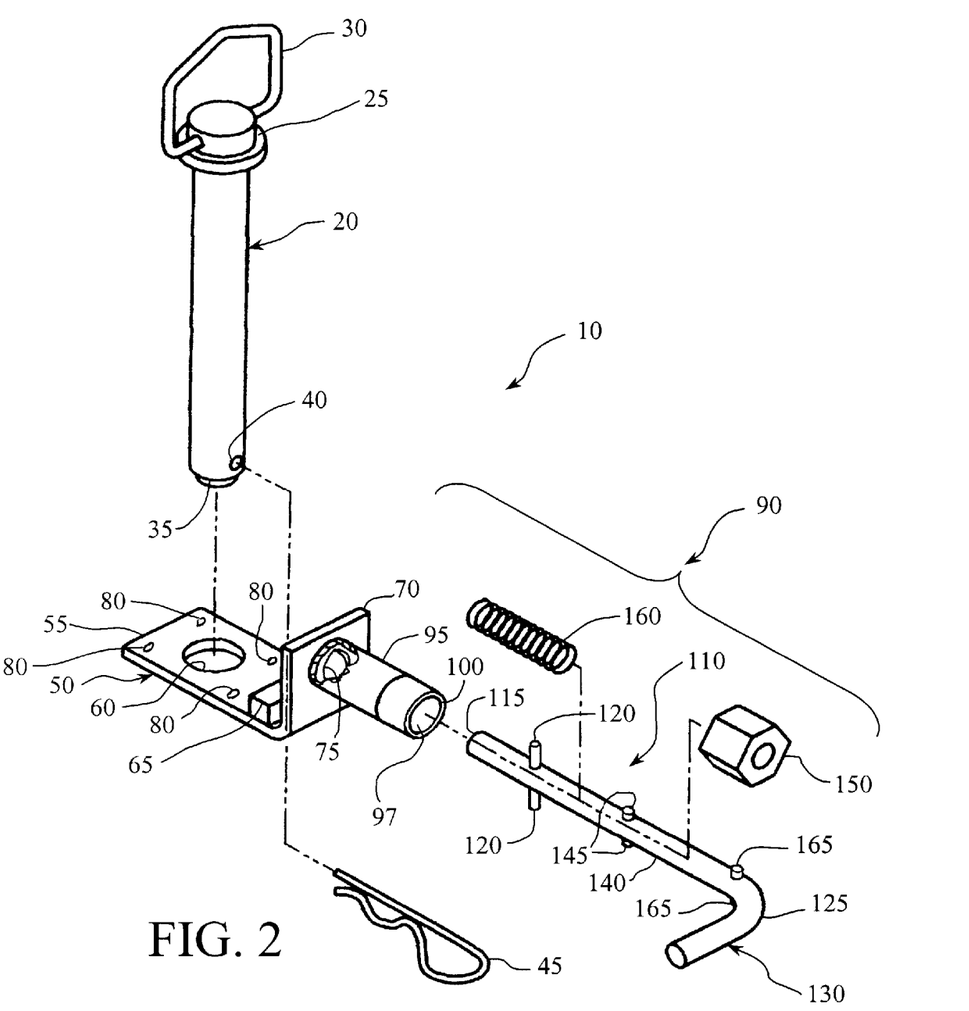
FIG. 2 is an elevated perspective exploded view, in reduced scale, of the trailer hitch pin retainer assembly of FIG. 1 with the trailer hitch removed for clarity and with a cut-away view of a portion of a receptacle.
Figure 3:
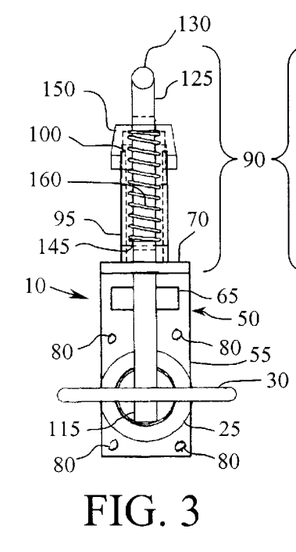
FIG. 3 is a rotated top plan view with some structure removed for clarity of the assembled trailer hitch pin retainer assembly of FIG. 1, in reduced scale, with a cut-away view of the spring-biased latch pin assembly and with the latch pin in an extended position.
Figure 4:
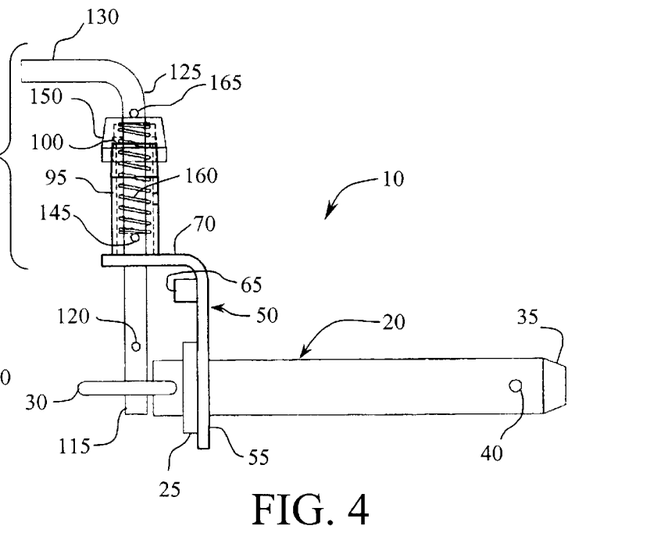
FIG. 4 is a rotated side plan view with some structure removed for clarity of the assembled trailer hitch pin retainer assembly of FIG. 3 with a cut-away view of the spring-biased latch pin assembly and with the latch pin in an extended position.
Figure 5:
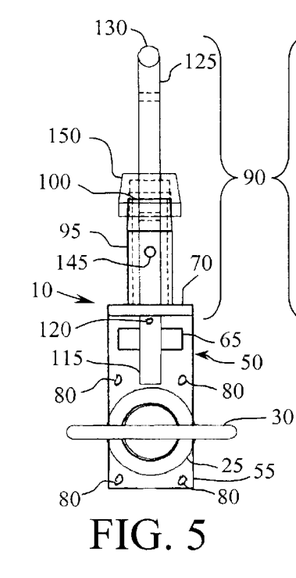
FIG. 5 is a rotated top plan view with some structure removed for clarity of the assembled trailer hitch pin retainer assembly of FIG. 1, in reduced scale, with a cut-away view of the spring-biased latch pin assembly and with the latch pin in a retracted position.
Figure 6:
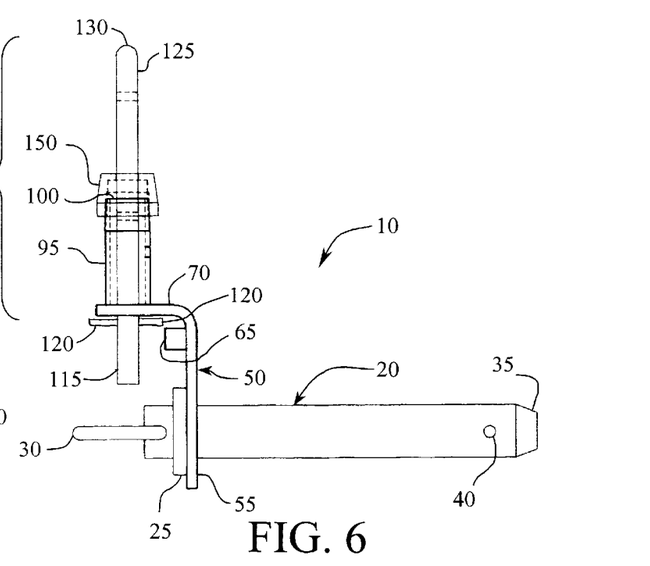
FIG. 6 is a rotated side plan view with some structure removed for clarity of the assembled trailer hitch pin retainer assembly of FIG. 5 with a cut-away view of the spring-biased latch pin assembly and with the latch pin in a retracted position and with a retaining pin releasably engaging the retainer ledge.
Figure 7:
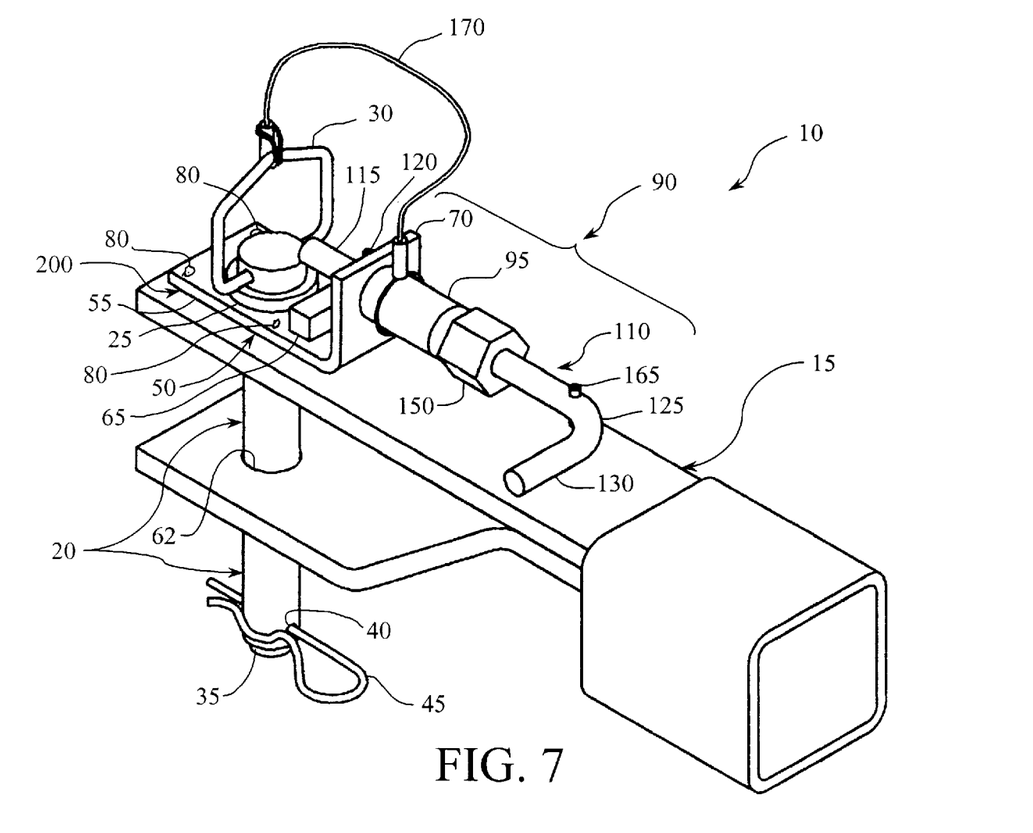
FIG. 7 depicts an elevated perspective view of the hitch pin retainer assembly of FIG. 1 with the latch pin in a retracted and rotated position with a retaining pin releasably engaging the retainer ledge.

The latch pin 110 is slidable between a retracted and an extended position. The extended position of the latch pin 110 is shown in FIGS. 1, 3, and 4 while the retracted position is shown in FIGS. 5, 6, and 7. With reference to FIGS. 1, 2, 3, and 4, the latch pin 110 is sized in length to extend, when in the extended position, through the recess 97 and the latch pin hole 75 and into the latch cage formed by the grip member 30. The latch pin is also formed with an engagement end 115 that includes a retraction pin 120 which is configured to releasably engage the retainer ledge 65 when the latch pin 110 is in the retracted and rotated position, as can be understood with reference to FIGS. 5, 6, and 7. The retraction pin 120 may be made from a plain steel spring pin such those available from the Fastenal Company. It is inserted into an aperture on the latch pin 110 during manufacture of the hitch pin retainer assembly 10 after the latch pin 110 has been inserted through the recess 97 and the latch pin hole 75. The latch pin 110 is also formed with a handle 130 at an opposite end 125 that can be integrally formed as part of the shank of the pin 110 as shown in the figures. Although not shown in the figures, the handle 130 may be replaced with any other type of equally suitable handle that enables retraction and rotation of the latch pin 110 for slidable movement between the extended and retracted positions. The latch pin 110 is also formed with a medial portion 140 between the engagement end 115 and the opposite end 125. The medial portion includes a spring or compressible resilient member seat or spring steel pin 145 sized to fit within the recess 97. Although shown in the figures as a pin, the spring or compressible resilient member seat may also be a combination of pins or circumferential ledge, formed on the shank of the latch pin 110, that is sized to seat one or more coils of a spring, or a compressible resilient member made from an elastic polymer such as, for example, rubber. Although a considerable selection of equally suitable materials are available, the latch pin 110 may be formed from a zinc plated group 3 steel material having a diameter of about 0.5 inches and a length of about 10.0 inches before the handle 130 is formed. Shorter segments may be used where other types of handles are incorporated.

The retainer latch assembly 90 also incorporates a receptacle cap 150 that is attached to the open end 100 of the receptacle 95. The cap 150 cooperates with the spring seat pin 145 to capture an extension spring 160, or a compressible resilient member, not shown but known in the art, made from an elastic polymer such as rubber, that is sized for receipt about the medial portion 140 and within the recess 97. The type of spring shown in FIG. 2 is also sometimes referred to as a compression spring by those with skill in the art. The receptacle cap 150 can be made, for example, from a pipe cap having a diameter of about 0.75 inches such as that available from the Fastenal Company as part number 466689. The spring 160 can be manufactured as a closed end, smooth ground end, coil spring from a steel music wire with an outer diameter of approximately 0.063 inches. Preferably, the spring 160 is formed with a free length of about 2.00 inches, a solid height of about 0.74 inches, an outer coil diameter of about 0.72 inches, with a spring constant of about 9 pounds force per inch. In alternative configurations, those with skill in the art are also familiar with comparable types of spring materials that can be used as compressible resilient members and that are made from elastomers, such as rubber and similar materials. Although not shown in the figures, one possible configuration made from such materials could include a generally elongated, tubular compressible resilient member positioned in place of the spring 160.

For purposes of description, the spring 160 is referred to as an "extension spring" to illustrate that its primary purpose is to bias the latch pin 110 into the extended position. The term "extension spring" is used interchangeably with compressible resilient member. In this configuration, the extension spring 160 is operative to bias the spring seat pin 145, and in turn the latch pin 110, towards the extended position. The latch pin 110 may also include an extended position limit pin 165 that is included between the medial portion 140 and the handle end 125 that is operative to limit the extent to which the latch pin 110 extends when in the extended position. This pin 165 can be useful to minimize the possibility of damage occurring to the handle 130 when the hitch pin retainer assembly 10 is subjected to severe vibrations during operation.

The preferred embodiment of the present invention is configured so that the base plate 50 is adapted to be fixedly attached to a trailer hitch member 15 that is formed with at least one shear pin aperture 62, see for example FIGS. 1 and 7. In this configuration, the latch pin 110, when in the extended position, is disposed within the latch cage and above the head portion 25 of the shear hitch pin assembly 20. In this position, the latch pin 110 prevents unintended displacement of the shear hitch pin assembly 20 during use of the retainer hitch assembly 10 for coupling a trailer hitch 15 to a trailer tongue (not shown).

Those with skill in the art will also appreciate from the forgoing description and figures that the placement and size of each of the components can be adjusted to accommodate varying amounts of freedom of movement and permissible displacement, if any, of the shear hitch pin assembly 20. More specifically, the size, shape, and position of the elements of the spring-biased retainer latch assembly 90 can be modified without departing from the spirit and scope of the invention as claimed below.

With continued reference to FIGS. 1 and 7, it can be further understood that a flexible, fibrous, plastic, or metal wire type tether 170 may be employed to connect the grip member 30 with any part of the hitch pin retainer assembly 10 or the trailer hitch 15 as an added protection against loss of the shear hitch pin assembly 20. A suitable tether cable would include, for example, a galvanized steel chain or cable having a diameter of approximately 0.06 inches that is preferably coated with a plastic, corrosion preventive material such as vinyl. Cable tethers of this type are commercially available in predetermined and custom lengths from hardware stores and commercial suppliers such as The McMaster Company of Chicago, Ill.

Figure 8:
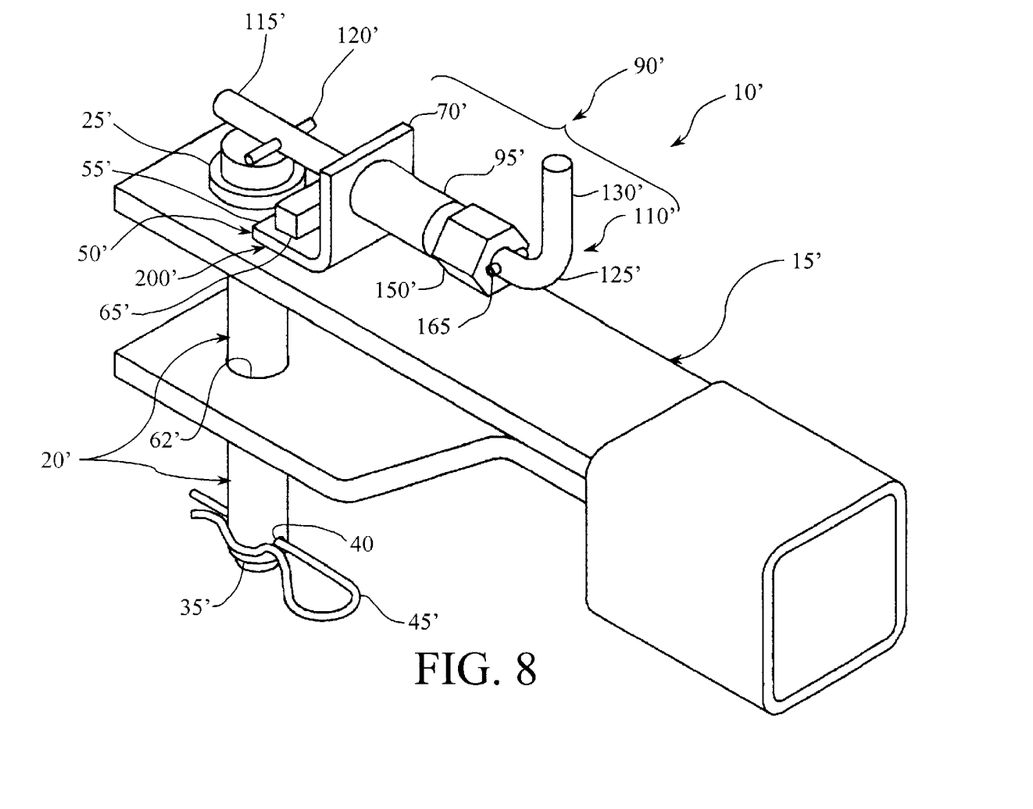
FIG. 8 depicts an elevated perspective view, in reduced scale, of an alternative embodiment of a trailer hitch pin retainer assembly contemplated by the present invention attached to a portion of a trailer hitch and with a spring-biased latch pin assembly in an extended position.

With reference to FIGS. 1, 7, and 8, it can be understood that the hitch pin retainer assemblies 10, 10' can be attached to the respective trailer hitch members 15, 15' by a weldment about the mate interface labeled by reference numeral 200. With reference to the same figures and additionally to FIG. 2, it can be appreciated that the hitch pin retainer assemblies 10, 10' can also be bolted to the trailer hitch members 15, 15' respectively. A combination of welds and bolts may also be used for an even stronger joint.

The hitch pin retainer assembly 10, 10' of the present invention is preferably either available as a pre-integrated element of a trailer hitch 15, 15' or as a kit that can be purchased either with or without the shear hitch pin assembly 20. It is configured to be adaptable and compatible for use with a wide array of trailer hitch and tongue assemblies and with any of a large number of different types of hitch pins. With reference to FIG. 8, it can be understood by those with skill in the art that the various modifications can be made to certain elements to provide an equally capable hitch pin retaining assembly 10'. In addition to modifications to the shear hitch pin assembly 20', the base plate 55' can also be modified, in variations of the preferred embodiment to exclude a portion of the base plate and the aperture 60, as can be understood with reference to FIG. 2, for purposes of reducing the amount of material needed to construct the invention. Additionally, the shortened base plate variation can be more readily welded or bolted to certain types of trailer hitch members 15' that may not have enough surface area to accommodate the larger variation shown in the other figures and identified by reference numeral 10. The present invention contemplates that each of the elements of the above-described variations may be used either alone, as a substitute, or in combination with any of the preceding features of the invention.

With reference again to FIGS. 1 through 8, one having skill in the art will understand that the preferred embodiment of the present invention is also directed to a method for preventing unwanted displacement of the shear hitch pin assembly 20, 20' from a trailer hitch 15, 15' having at least one aperture 62, 62' sized to receive the shear hitch pin assembly. The method includes selecting a hitch pin retainer assembly 10, 10' that includes a hitch plate assembly 50, 50' and a latch assembly 90, 90'. The hitch plate assembly 50, 50' has a base plate 55, 55' and a latch plate 70, 70' having a latch pin hole 75 (see FIG. 2). The base plate 55, 55' also includes a retainer ledge 65, 65'. The latch assembly 90, 90' includes a spring-biased latch pin 110, 110' captivated within a receptacle 95, 95' that is substantially centered about and mounted from the latch plate 70, 70'. The latch pin 110, 110' is slidable between a retracted and an extended position and it is biased by a spring 160 (see FIG. 2) or compressible resilient member mounted on the latch pin 110, 110' towards the extended position. The latch pin 110, 110' is sized to obstruct, when in the extended position, the shear hitch pin assembly 20, 20' to prevent unintended displacement and or removal. The latch pin 110, 110' includes a handle 130, 130' at one end and a retaining pin 120, 120' proximate to an opposite engagement end 115,115'. The retaining pin 120, 120' is adapted to releasably engage the retainer ledge 65, 65' to hold the latch pin 110, 110' in the retracted position.

Once the hitch pin retainer assembly 10, 10' is selected, it is attached to the trailer hitch 15, 15' whereby the hitch pin assembly 10, 10' is operative to prevent unintended displacement of the hitch pin assembly from the trailer hitch 15, 15' when the latch pin 110, 110' is in the extended position. After attachment, the latch pin 110, 110' of the hitch pin retainer assembly 10, 10' is moved to the retracted position and rotated to releasably engage the retaining pin 120, 120' with the retainer ledge 65, 65'. Then, the shear hitch pin assembly 20, 20' is inserted into the at least one aperture 62, 62' of the trailer hitch 15, 15'.

After insertion, the latch pin 110, 110' is rotated to disengage the retaining pin 120, 120' from the retainer ledge 65, 65' and the spring-biased latch pin 110, 110' is released to extend to the extended position whereby the engagement end 115, 115' of the latch pin 110, 110' is disposed above the shear hitch pin assembly 20, 20' to prevent unintended displacement.

From the foregoing, it will be appreciated that the present invention provides a simple apparatus and method for eliminating avoidable manufacturing costs, unnecessary complication during operation, and for enabling improved retention of shear hitch pins that are used for coupling trailer hitches to trailer tongues during towing operations. The apparatus of the present invention is simple to use, inexpensive to manufacture, is compatible for use with a wide variety of trailer hitch and tongue equipment and can be used any of a large number of shear hitch pins.

The present invention therefore fulfills a real but heretofore unmet need for low-cost and reliable hitch pin retainer assemblies. While particular preferred embodiments of the invention have been illustrated and described, various modifications to and combinations of the above embodiments can be made without departing from the spirit and scope of the invention, and all such modifications, combinations, and equivalents are intended to be covered and claimed by the following claims.

What is claimed is:

1. A hitch pin retainer assembly, comprising:

a shear pin assembly including a head portion opposite a tapered end;

a hitch plate assembly having a base plate formed with an aperture adapted to receive the shear pin assembly and having a retainer ledge, the hitch plate assembly also including a latch plate carried from the base plate and formed with a latch pin hole;

a retainer latch assembly that incorporates a receptacle substantially centered about the latch pin hole and projecting from the latch plate and formed with an interior recess having an open end adapted to receive a latch pin slidable between a retracted and an extended position, the latch pin sized to extend, when in the extended position, through the recess and into the latch cage and formed with an engagement end having a retainer pin configured to releasably engage the retainer ledge and an opposite end having a handle, the latch pin also formed with a medial portion between the engagement end and opposite end including a spring seat pin, the retainer latch assembly also including a receptacle cap attached to the open end of the receptacle to capture an extension spring received about the medial portion and within the recess and operative to bias the latch pin towards the extended position; and wherein the base plate is adapted to be fixedly attached to a trailer hitch member formed with at least one shear pin aperture whereby the latch pin in the extended position is disposed above the head portion of the shear pin to obstruct displacement during use of the retainer hitch assembly.

2. A hitch pin retainer assembly according to claim 1 wherein the base plate portion of the hitch pin retainer assembly includes a pattern of at least one bolt hole adapted so that the hitch pin retainer assembly can be bolted to the trailer hitch with at least one bolt.

3. A hitch pin retainer assembly according to claim 1 wherein the base plate is welded to the trailer hitch.

4. A hitch pin retainer assembly for preventing unintended displacement from a trailer hitch of a shear pin assembly that includes a head portion opposite a tapered end, comprising:

a hitch plate assembly having a base plate formed with an aperture adapted to receive the shear pin assembly and having a retainer ledge, the hitch plate assembly also including a latch plate carried from the base plate and formed with a latch pin hole;

a latch assembly that incorporates a receptacle substantially centered about the latch pin hole and projecting from the latch plate and formed with an interior recess having an open end adapted to receive a latch pin slidable between a retracted and an extended position, the latch pin sized to extend, when in the extended position, through the recess to be disposed above the head portion of the shear pin, the latch pin being formed with a handle at one end and an opposite engagement end having a retainer pin configured to releasably engage the retainer ledge, the latch pin also formed with a medial portion between the ends that includes a spring seat, the latch assembly also including a cap attached to the open end of the receptacle to capture an extension spring received about the medial portion and within the recess that is operative to bias the spring seat of the latch pin towards the extended position; and wherein the base plate is adapted to be fixedly attached to a trailer hitch member formed with at least one shear pin aperture whereby the unintended displacement of the shear pin is prevented during use of the hitch pin retainer assembly.

5. A hitch pin retainer assembly according to claim 4 wherein the base plate of the hitch pin retainer assembly includes a pattern of at least one bolt hole adapted so that the hitch pin retainer assembly can be bolted to the trailer hitch with at least one bolt.

6. A hitch pin retainer assembly according to claim 4 wherein the base plate is welded to the trailer hitch.

7. A kit for retaining a shear pin in a trailer hitch, comprising:

a hitch plate assembly with a base plate formed with a retainer ledge and an angled latch plate with a latch pin hole; and a latch assembly that includes a spring-loaded latch pin received within a captive receptacle substantially centered about and mounted from the angled latch plate, the latch pin being slidable between a retracted and an extended position and sized to be disposed above the shear pin, when in the extended position, to prevent unwanted displacement of the shear pin from the trailer hitch and including a handle at one end and having a retaining pin proximate to a distal end adapted to releasably engage the retainer ledge to hold the latch pin in the retracted position.

8. The kit for retaining a shear pin in a trailer hitch according to claim 7 wherein the hitch pin retainer assembly is attached to the trailer hitch by welding the base plate to the trailer hitch.

9. The kit for retaining a shear pin in a trailer hitch according to claim 7 wherein the base plate includes a pattern of at least one bolt hole and the hitch pin retainer assembly is bolted to the trailer hitch with at least one bolt.

10. A method for preventing unwanted displacement of a shear hitch pin assembly from a trailer hitch having at least one aperture sized to receive the shear hitch pin assembly, that includes the steps of:

selecting a hitch pin retainer assembly that includes a hitch plate assembly and a latch assembly, the hitch plate assembly having a base plate and a latch plate with a latch pin hole, the base plate also including a retainer ledge, the latch assembly including a spring-biased latch pin captivated within a receptacle and substantially centered about and mounted from the latch plate, the latch pin being slidable between a retracted and an extended position and biased towards the extended position and sized to obstruct, when in the extended position, the shear hitch pin assembly and including a handle at one end and including a retaining pin, proximate to an opposite end, adapted to releasably engage the retainer ledge to hold the latch pin in the retracted position;

attaching the hitch pin retainer assembly to the trailer hitch whereby the hitch pin assembly is operative to prevent unintended displacement of the hitch pin assembly from the trailer hitch when the latch pin is in the extended position;

retracting the latch pin of the hitch pin retainer assembly to the retracted position and rotating to releasably engage the retaining pin with the retainer ledge;

inserting the shear hitch pin assembly into the at least one aperture of the trailer hitch; and rotating the latch pin of the hitch pin retainer assembly to disengage the retaining pin from the retainer ledge and releasing the spring-biased latch pin assembly to the extended position whereby the engagement end of the latch pin is disposed above the shear hitch pin assembly to prevent unintended displacement.

11. The method for preventing unwanted displacement of a hitch pin assembly from a trailer hitch according to claim 10 wherein the hitch pin retainer assembly is attached to the trailer hitch by welding the base plate to the trailer hitch.

12. The method for preventing unwanted displacement of a hitch pin assembly from a trailer hitch according to claim 10 wherein the hitch pin retainer assembly further includes a pattern of at least one bolt hole and is bolted to the trailer hitch by at least one bolt.

* * * * *